April 17, 1962 T. H. KERRY ETAL 3,030,051
VERTICAL LIFT ENGINE FOR AN AIRCRAFT
Filed Aug. 8, 1960 4 Sheets-Sheet 1

Thomas Henry Kerry
Maurice Ian Taylor
Inventors

By
Cushman, Darby & Cushman
Attorneys

April 17, 1962 T. H. KERRY ETAL 3,030,051
VERTICAL LIFT ENGINE FOR AN AIRCRAFT
Filed Aug. 8, 1960 4 Sheets-Sheet 2

Thomas Henry Kerry
Maurice Ian Taylor
Inventors

By
Cushman, Darby & Cushman
Attorneys

April 17, 1962  T. H. KERRY ETAL  3,030,051
VERTICAL LIFT ENGINE FOR AN AIRCRAFT
Filed Aug. 8, 1960  4 Sheets-Sheet 3

Thomas Henry Kerry
Maurice Ian Taylor
Inventors

By
Cushman, Darby & Cushman
Attorneys

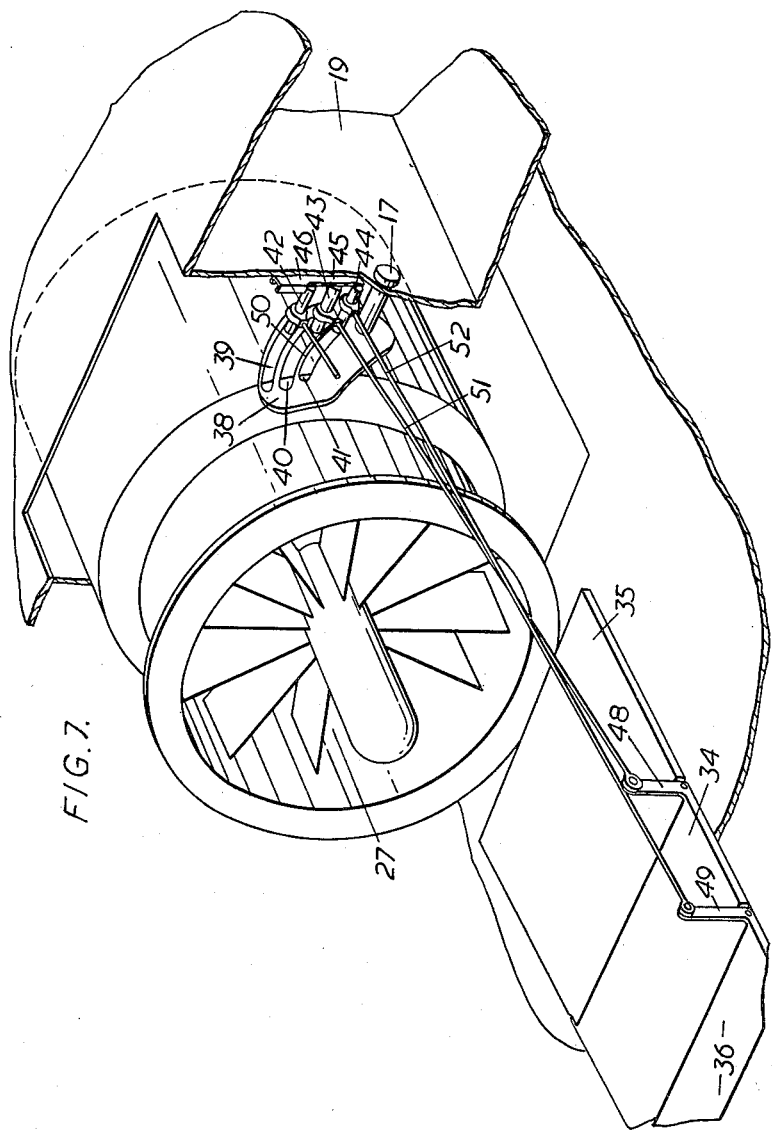

United States Patent Office 3,030,051
Patented Apr. 17, 1962

3,030,051
VERTICAL LIFT ENGINE FOR AN AIRCRAFT
Thomas Henry Kerry, Derby, and Maurice Ian Taylor, Allestree, England, assignors to Rolls-Royce Limited, Derby, England, a British company
Filed Aug. 8, 1960, Ser. No. 47,968
Claims priority, application Great Britain Aug. 10, 1959
7 Claims. (Cl. 244—23)

This invention concerns engines for use in aircraft adapted for vertical take-off and landing.

Such aircraft may be provided, in addition to forward propulsion engines, with vertical lift engines which are employed during take-off and landing of the aircraft. The term "vertical lift engines," as used in this specification, is to be understood to mean engines arranged to produce lift forces on the aircraft independently of lift forces generated aerodynamically by forward flight.

In order to start the vertical lift engines when it is required to land the aircraft, it is necessary to direct an adequate supply of air into the air intakes of all the vertical lift engines. It is therefore the object of the present invention to provide an arrangement which shall be satisfactory in this respect.

According to the present invention there is provided a vertical lift engine for an aircraft comprising mounting means such that the engine may be moved between a horizontal and a vertical position, a guide vane structure for deflecting ambient air into the engine air intake, and means, controlled by movement of the engine from the horizontal towards the vertical position, for moving at least a portion of the guide vane structure relatively to the engine so as to maintain the guide vane structure throughout said movement in a position in which air is deflected into the air intake.

Preferably the engine is mounted for rotation about a horizontal axis and there is at least one linkage one end of which is pivotally connected to a portion of the guide vane structure and the other end of which bears against fixed structure at a point or points displaced from said horizontal axis. Cam means may be provided for adjusting the position of the said other end of the linkage during rotation of the engine.

The guide vane structure preferably comprises a plurality of vanes which are movable relatively to the engine and a plurality of axially directed vanes which are stationary relatively to the engine, the stationary vanes being disposed inwardly of and adjacent to the movable vanes.

The engine may be mounted within a compartment, sealing means being provided for sealing the walls of the engine to those of the compartment in both the horizontal and the vertical position.

The invention also comprises an aircraft provided with a plurality of such vertical lift engines.

The invention is illustrated, merely by way of example, in the accompanying drawings in which:

FIGURE 7 is an isometric view of the said vertical lift engine.

Figure 1:
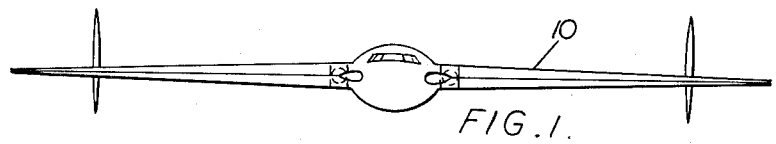
FIGURES 1 and 2 are respectively a front elevation and a plan of an aircraft provided with a plurality of vertical lift engines according to the invention.
Figure 2:
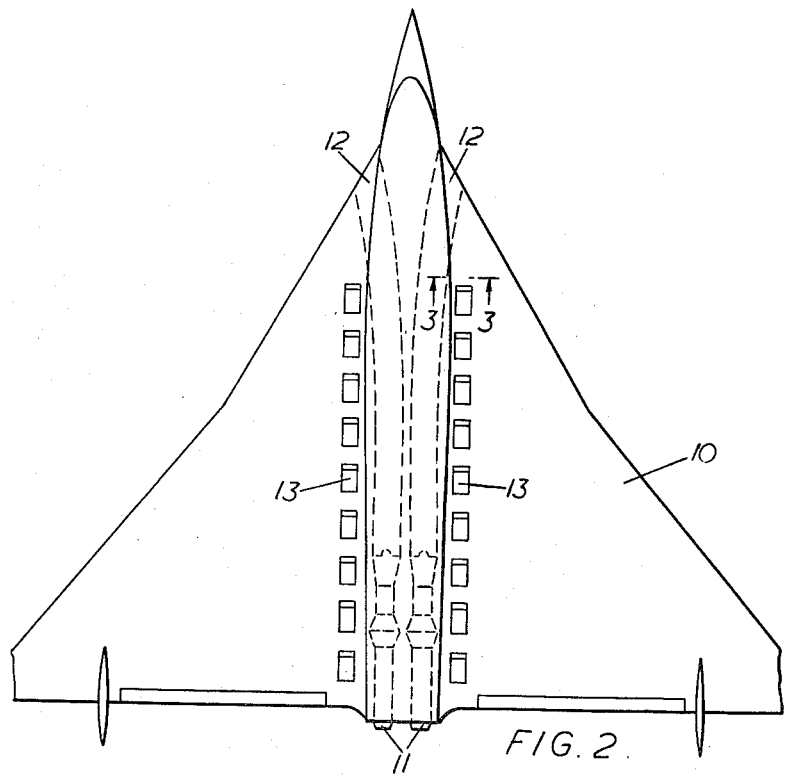

Referring first to FIGURES 1 and 2, a delta-wing aircraft 10 is provided with two forward propulsion gas turbine, jet reaction engines 11, having longitudinally extending intake ducts 12, and two parallel, longitudinally extending, rows of vertical lift gas turbine, jet reaction engines 13.

Figure 3:
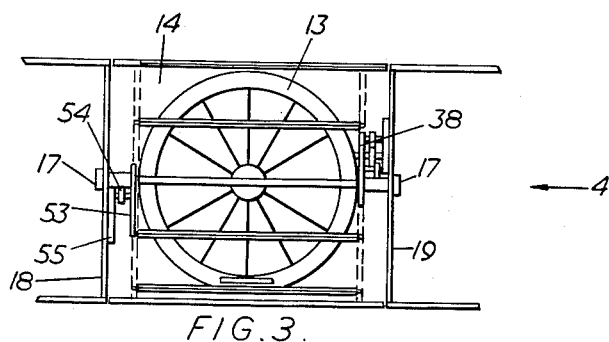
FIGURE 3 is a front elevation of one of the said vertical lift engines taken on the line 3—3 of FIGURE 2.

Each engine 13 (see FIGURES 3 and 4) is disposed within a compartment 14 whose upper and lower walls 15, 16 form part of the upper and lower surfaces of the wing of the aircraft. Each engine 13 is mounted on trunnions 17 so that the engine may be rotate (by means not shown) between the horizontal, or "stowed away" position shown in FIGURE 4 and the vertical position shown in FIGURE 6. The trunnions 17, which extend horizontally and which are disposed at right angles to the longitudinal axis of the aircraft, are mounted in side walls 18, 19 of the compartment 14.

Figure 4:
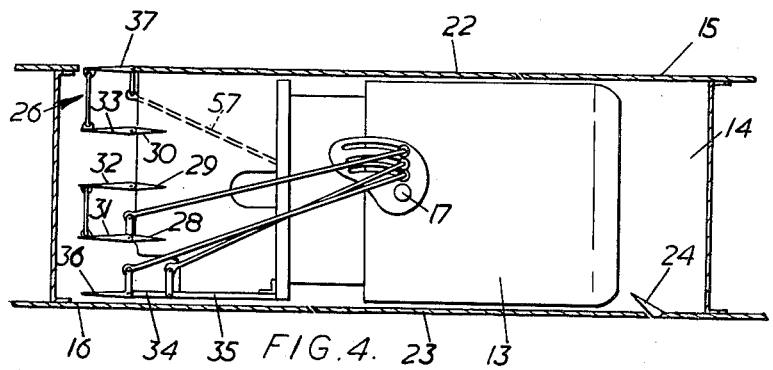
FIGURE 4 is a side elevation looking in the direction of the arrow 4 of FIGURE 3 and showing a vertical lift engine in an horizontal, or "stowed away" position.
Figure 5:
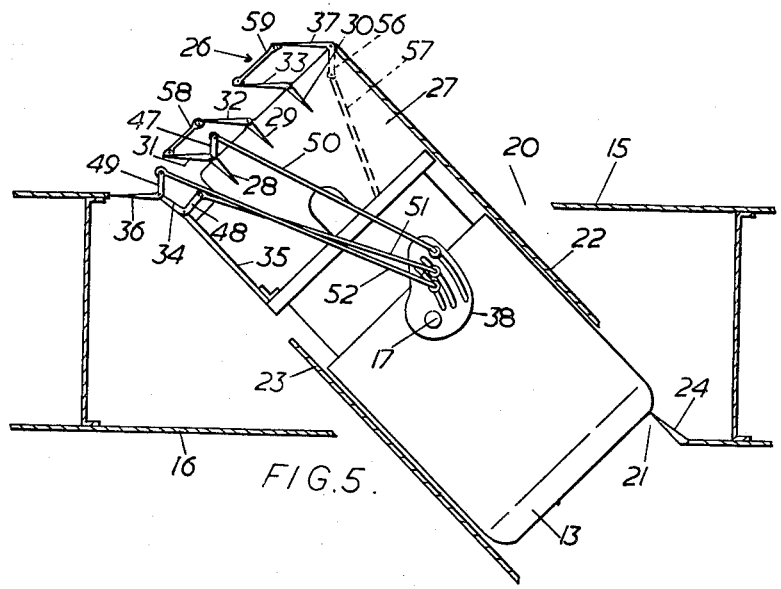
FIGURES 5 and 6 are views similar to FIGURE 4 but showing the engine in an inclined, and in a vertical position, respectively.
Figure 6:
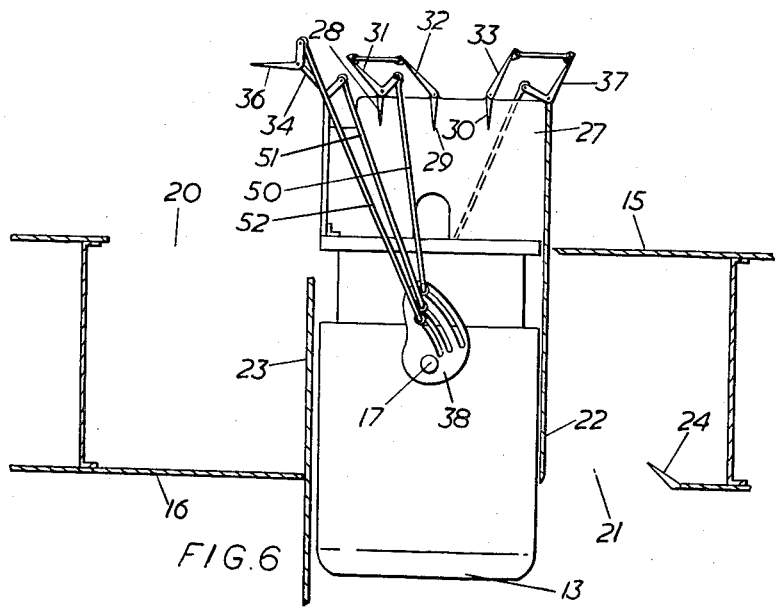

The walls 15, 16 are provided with apertures 20, 21 respectively (best seen in FIGURES 5 and 6). Each engine 13 carries doors 22, 23 which, in the horizontal position shown in FIGURE 4, are aligned with the walls 15, 16 and are substantially sealed with respect thereto by means of a sealing lip 24 on the wall 16 and by means of part of a guide vane structure 26 which is carried by the engine 13 and which is described in detail below.

In the inclined position shown in FIGURE 5, in which the engine 13 projects through the apertures 20, 21, the sealing lip 24 remains substantially in sealing contact with the engine 13 whilst part of the guide vane structure 26 maintains substantial sealing contact with the wall 15. Such sealing is employed so as to prevent exhaust gases from the engine 13 being ingested into the air intake 27 thereof.

Similarly, in the vertical position of the engine 13 shown in FIGURE 6, the doors 22, 23 are substantially in sealing contact with the walls 15, 16.

The guide vane structure 26 is provided for the deflection of ambient air into the air intake 27. The guide vane structure 26 comprises transversely spaced, axially extending guide vanes 28, 29, 30 which are fixed with respect to the engine 13 but which are, of course, movable together therewith. The structure 26 also comprises guide vanes 31, 32, 33 which are pivoted to and disposed outwardly of the vanes 28, 29, 30 respectively. Additionally the structure 26 comprises a guide vane 34 extending outwardly of, and pivoted to, a strut 35 which is secured to the air intake 27, a guide vane 36 pivoted to and extending outwardly of the guide vane 34, and a guide vane 37 pivoted to the door 22 at what is, in the horizontal position of the parts, the rear end thereof.

A cam plate 38 is fixed to one side of the engine 13 and is provided with three cam slots 39, 40, 41 in which are movably mounted pivot rods 42, 43, 44 respectively. The pivot rods 42–44 bear against and are free to move up and down a vertical wall 45 formed in a cut away portion of a fixed member 46. Links 47, 48, 49 are secured to the guide vanes 31, 34 and 36 respectively while links 50, 51, 52 are pivoted at one end to the pivot rods 42–44 and at the other end to the links 47–49.

On the side of the engine opposite to that provided with the cam plate 38 there is mounted a cam plate 53. The cam plate 53 has a single cam slot (not shown) in which is movably mounted a pivot rod 54 which bears against and may move up and down a vertical wall of a fixed member 55. A link 56 is secured to the guide vane 37 and a link 57 is pivotally connected at one end to the link 56 and at the other end to the pivot rod 54.

The guide vanes 32, 33 are connected to the guide vanes 31, 37 respectively by pivoted links 58, 59, respectively.

When the aircraft is in forward flight, the engines 13 are stowed away as shown in FIGURE 4 and the guide vanes 31–34, 36 and 37 will be aligned with the guide vanes 28–30 and strut 35. When, however, it is required to land the aircraft, the forward speed of the aircraft is reduced and the engines 13 are rotated via the FIGURE 5 position, in which they are first brought into operation, and so into the FIGURE 6 position.

During such rotation of the engines 13, the pivot pins 42–44 and 54 will be adjusted by the cam plate 38, 53 and the links 50–52 and 57–59 will cause movement of the guide vanes 31–34, 36 and 37 relatively to the fixed guide vanes. As a result, when the engine is in the FIGURE 5 position, the guide vanes 31–34, 36 and 37 will be correctly disposed to direct ram air into the engine intake 27 while the guide vanes 28–30 will ensure that this air is axially directed into the engine. Finally, as the engine is rotated into the FIGURE 6 position, there will be yet further pivotal movement of the guide vanes 31–34, 36 and 37 so that the latter continue to be in the correct position for directing the ram air into the air intake.

We claim:

1. A vertical lift engine for an aircraft comprising mounting means to permit movement of the engine between a horizontal and a vertical position, a guide vane structure for deflecting ambient air into the engine air intake, and means operatively connected to said guide vane structure, and controlled by movement of the engine from the horizontal towards the vertical position for moving at least a portion of the guide vane structure relatively to the engine, the guide vane structure throughout said movement being maintained in a position in which air is deflected into the air intake.

2. A vertical lift engine for an aircraft comprising means for mounting the engine for rotation about an horizontal axis, a guide vane structure for deflecting ambient air into the engine air intake, at least one linkage one end of which is pivotally connected to a portion of the guide vane structure, and fixed structure against which the other end of the linkage bears at a point displaced from said horizontal axis, movement of the engine from the horizontal towards the vertical position causing movement of said guide vane structure portion relatively to the engine, the guide vane structure throughout said movement being maintained in a position in which air is deflected into the air intake.

3. A vertical lift engine for an aircraft comprising means for mounting the engine for rotation about an horizontal axis, a guide vane structure for deflecting ambient air into the engine air intake, at least one linkage one end end of which is pivotally connected to a portion of the guide vane structure, fixed structure against which the other end of the linkage bears at a point displaced from said horizontal axis, and cam means for adjusting the position of the said other end of the linkage during rotation of the engine, movement of the engine from the horizontal towards the vertical position causing movement of said guide vane structure portion relatively to the engine, the guide vane structure throughout said movement being maintained in a position in which air is deflected into the air intake.

4. A vertical lift engine for an aircraft comprising means for mounting the engine for rotation about an horizontal axis, a guide vane structure for deflecting ambient air into the engine air intake, said guide vane structure comprising a plurality of vanes which are movable relatively to the engine and a plurality of axially directed vanes which are stationary relatively to the engine, the stationary vanes being disposed inwardly of and adjacent to the movable vanes, at least one linkage one end of which is pivotally connected to the movable vanes, and fixed structure against which the other end of the linkage bears at a point displaced from said horizontal axis, movement of the engine from the horizontal towards the vertical position causing movement of said movable vanes relatively to the engine, the guide vane structure throughout said movement being maintained in a position in which air is deflected into the air intake.

5. An engine compartment, a vertical lift engine mounted therein for rotation about an horizontal axis, sealing means for sealing the walls of the engine to those of the compartment in both the horizontal and the vertical positions, a guide vane structure for deflecting ambient air into the engine air intake, at least one linkage one end of which is pivotally connected to a portion of the guide vane structure, and fixed structure against which the other end of the linkage bears at a point displaced from said horizontal axis, movement of the engine from the horizontal towards the vertical position causing movement of said guide vane structure portion relatively to the engine, the guide vane structure throughout said movement being maintained in a position in which air is deflected into the air intake.

6. In a vertical lift aircraft having an engine compartment: a vertical lift engine, means for mounting said engine in the compartment for selective movement between a stowed horizontal position and a vertical position, a guide vane structure for deflecting ambient air into the engine as the engine is being moved from horizontal to vertical position, and means operatively connected to said guide vane structure for moving at least a portion of the same, said last-mentioned means being controlled by a movement of said engine from the horizontal toward the vertical position whereby the guide vane structure throughout movement of said engine is maintained in position in which air is deflected into the air intake.

7. In a vertical lift aircraft having an engine compartment: a vertical lift engine, means for mounting said engine in the compartment for selective movement between a stowed horizontal position and a vertical position, a guide vane structure carried by said engine for deflecting ambient air into the engine as the engine is being moved from horizontal to vertical position, and means operatively connected to said guide vane structure for moving at least a portion of the same, said last-mentioned means being controlled by a movement of said engine from the horizontal toward the vertical position whereby the guide vane structure throughout the movement of said engine is maintained in position in which air is deflected into the air intake.

References Cited in the file of this patent

UNITED STATES PATENTS

| | | |
|---|---|---|
| 2,926,869 | Sullivan | Mar. 1, 1960 |
| 2,932,945 | Brandt | Apr. 19, 1960 |
| 2,997,257 | Kerry | Aug. 22, 1961 |
| 2,999,656 | Ward | Sept. 12, 1961 |